UNITED STATES PATENT OFFICE.

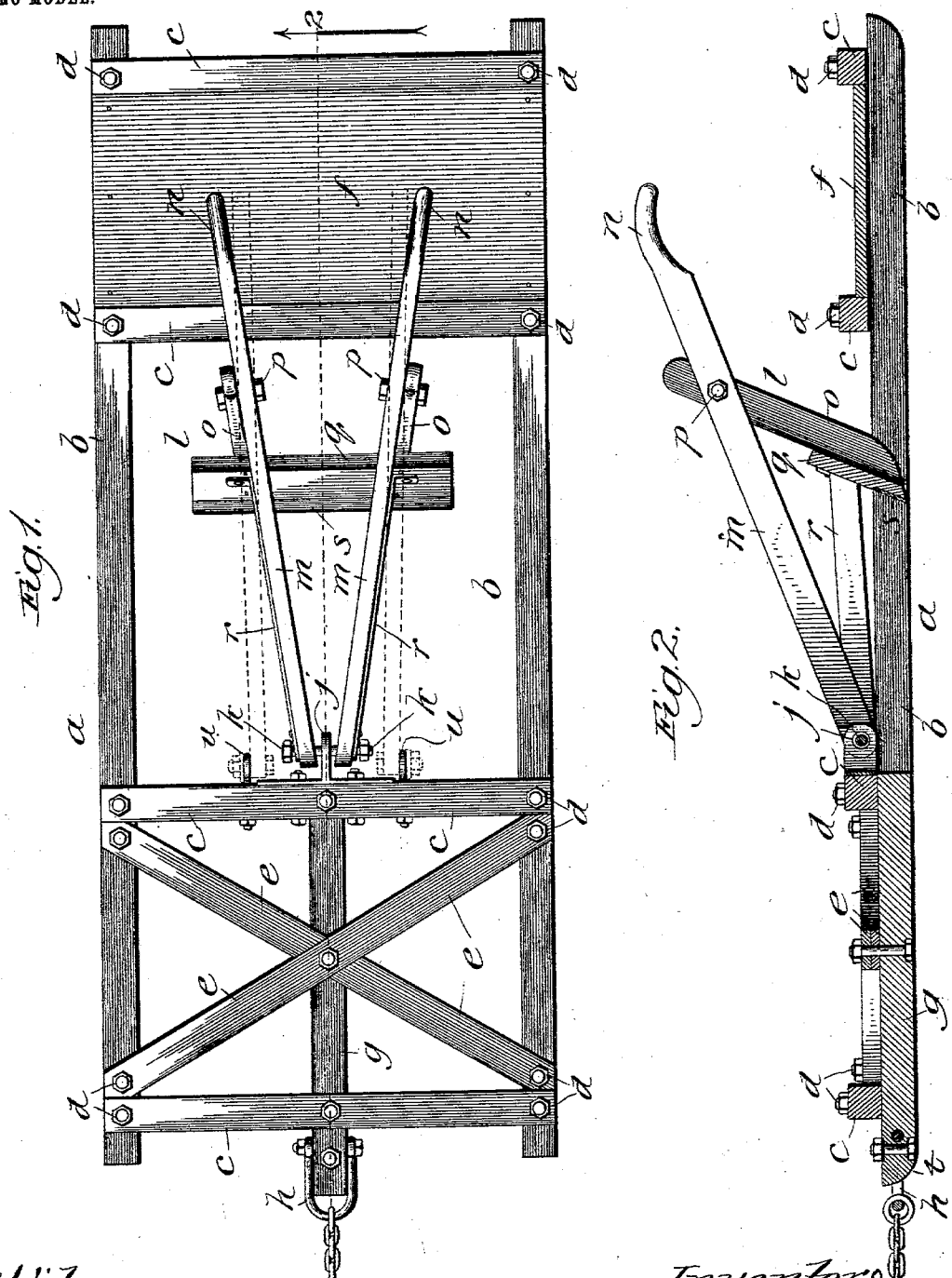

CHARLES EILRICH AND DAVID BRECKENRIDGE, OF CHICAGO, ILLINOIS.

TRENCH-FILLER.

SPECIFICATION forming part of Letters Patent No. 720,906, dated February 17, 1903.

Application filed November 17, 1902. Serial No. 131,707. (No model.)

*To all whom it may concern:*

Be it known that we, CHARLES EILRICH and DAVID BRECKENRIDGE, of Chicago, in the county of Cook and State of Illinois, have invented a new, useful, and Improved Trench-Filler, of which the following is a full, clear, and exact description, reference being had to the accompanying drawings, forming a part of this specification, in which similar letters of reference in the different figures indicate like parts.

In making connections with sewers and gas and water mains upon public streets and roads it is customary to excavate lateral trenches for the reception of the drains or other "stubs" extending to the several adjacent lots. The filling of these trenches with the soil thrown out therefrom has, under the methods heretofore employed, been a slow, difficult, and onerous task. The object of our invention is to overcome this difficulty by providing means whereby said trenches, whether wide or narrow, may be easily filled without interfering with or varying the regularity of the street-level, all of which is hereinafter more particularly described, and definitely pointed out in the claims.

In the drawings, Figure 1 is a plan view of a machine embodying the features of our invention; and Fig. 2 is a vertical sectional view thereof, taken upon the line 2, Fig. 1, viewed in the direction of the arrow there shown.

Referring to the drawings, $a$ represents the main frame of our machine, which consists, preferably, of two long straight runners $b$ $b$, arranged parallel to each other and connected by a series of two or more, but preferably four, cross-bars $c$, rigidly bolted to said runners by means of bolts $d$. Diagonal braces $e$ $e$ are also bolted in like manner to the forward end of said frame to impart rigidity thereto, while between the rear cross-bars $c$ $c$ we secure boards $f$ to serve as a platform upon which the operator may stand to operate the machine.

A draw-bar $g$, which is arranged between and parallel with the runners $b$ $b$, is securely bolted to the forward cross-bars $c$ and is provided with a clevis $h$, to which the motive power may be attached for propelling the same.

Bolted or otherwise rigidly attached to the second cross-bar $c$ from the front is a clevis or eye $j$, to which is jointedly attached, preferably by means of a bolt $k$, the forward ends of the frame of a scraper, (designated generally by the reference-letter $l$.) Said scraper consists of the inclined diverging bars $m$ $m$, having handles $n$ $n$ at the upper ends thereof, the downwardly and forwardly inclined supports $o$ $o$, the upper ends of which are bolted, respectively, as shown at $p$, to the handle-bars, the horizontal scraper $q$, which is rigidly bolted to the lower ends of said supports $o$, and the bars $r$ $r$, which are bolted to said scraper at or near its ends, as shown, and extending forward and loosely or jointedly connected, in common with the handle-bars $m$, to the bolt $k$. The scraper-bar $q$ is faced in front with a metal plate $s$ to protect it from wear and to form a cutting edge. The runners $b$ are rounded upwardly at their forward ends, as shown at $t$, Fig. 2, upon the draw-bar $g$.

The frame $a$ is intended to be drawn upon the ground like a sled, from which it will readily be seen that the forward end of the scraper-frame must always maintain a fixed relation to the plane of the street-level, while the scraper is free to be moved up or down or sidewise, as the operator may deem necessary. In operating our improved device the attendant stands upon the platform $f$ and grasping the handles $n$ is enabled by holding the bottom of the scraper-blade upon a level with the bottom of the runners, which serve as a guide, to scrape the piles of earth into the trenches and by lifting on the handles when the scraper is over the trench to prevent the latter from dropping therein and striking the solid earth upon the opposite side of the trench. The device may be propelled by means of two or more horses driven upon opposite sides of the street, so as to avoid the trenches, or by means of a long rope, an engine, and winding-drum.

We prefer to make the runners from eighteen to twenty feet in length, which is sufficient to enable the device to pass over trenches from six to eight feet in width while maintaining a general level.

Instead of having a jointed connection in the nature of a swivel like that described and shown in full lines the forward ends of the bars *m m* and *r r* may be attached to eyebolts *u u*, placed farther apart, as shown in Fig. 1, in which the respective bars named are indicated in dotted lines. Such a construction would permit of an up and down movement only of the scraper. In such a case it is obvious that the length of the scraper-bar *q* may be increased.

Having thus described our invention, we claim—

1. In a device of the class described, the combination with an elongated frame having straight runners, of a transverse scraper jointedly attached at its forward end to said frame between the front and rear ends thereof, a platform upon said frame in the rear of said scraper, and handles upon said scraper in operative proximity to said platform.

2. A device of the class described, in which is combined a skeleton frame having straight longitudinal runners, a transverse scraper provided with rearwardly-extended handle-bars, means for jointedly connecting the forward end of said scraper to said frame between said runners and some distance back from the forward end thereof, and a platform at the rear of said handle-bars.

In testimony whereof we have signed this specification, in the presence of two subscribing witnesses, this 15th day of November, 1902.

CHARLES EILRICH.
DAVID BRECKENRIDGE.

Witnesses:
D. H. FLETCHER,
CARRIE E. JORDAN.